United States Patent [19]

Morehouse et al.

[11] 4,396,964
[45] Aug. 2, 1983

[54] RECIRCULATING AIR SYSTEM FOR MAGNETIC DISK DRIVE

[75] Inventors: James H. Morehouse, Jamestown; Mark A. Swenson, Broomfield, both of Colo.

[73] Assignee: Storage Technology Corporation, Louisville, Colo.

[21] Appl. No.: 165,255

[22] Filed: Jul. 2, 1980

[51] Int. Cl.³ ............................................. G11B 5/10
[52] U.S. Cl. ...................................... 360/98; 165/47
[58] Field of Search ..................... 165/47; 360/86, 97, 360/98, 99, 133, 135

[56] References Cited

U.S. PATENT DOCUMENTS

| | | | |
|---|---|---|---|
| 3,723,980 | 3/1973 | Gabor | 360/98 |
| 3,800,325 | 3/1974 | O'Brien | 360/98 |
| 3,825,951 | 7/1974 | Katsumori et al. | 360/98 |
| 3,846,835 | 11/1974 | Horovitz et al. | 360/98 |
| 3,882,473 | 5/1975 | Hoehmann | 360/98 |
| 4,130,845 | 12/1978 | Kulma | 360/98 |
| 4,167,029 | 9/1979 | Ragle et al. | 360/98 |
| 4,194,225 | 3/1980 | Hasler | 360/98 |
| 4,229,774 | 10/1980 | Janssen et al. | 360/98 |
| 4,280,155 | 7/1981 | Scott et al. | 360/98 |
| 4,282,554 | 8/1981 | Ho et al. | 360/97 |
| 4,339,777 | 7/1982 | Gruczelak | 360/97 |

FOREIGN PATENT DOCUMENTS 55-67978  5/1980  Japan .................................... 360/98

Primary Examiner—Samuel Scott
Assistant Examiner—Margaret A. Focarino
Attorney, Agent, or Firm—Woodcock, Washburn, Kurtz, Mackiewicz & Norris

[57] ABSTRACT

In a magnetic disk drive unit, air is pumped by the magnetic disks through a closed recirculating air path extending over and under the base plate. The air is pumped through a heat exchanger and an air filter to maintain uniform temperature and cleanliness of the recirculating air. A blower driven from the motor which drives the hub pumps air through the ambient side of the heat exchanger to effect a heat transfer from the enclosure.

8 Claims, 8 Drawing Figures

RECIRCULATING AIR SYSTEM FOR MAGNETIC DISK DRIVE

BACKGROUND OF THE INVENTION

This invention relates to magnetic disk drives and more particularly, to a system for recirculating air in an enclosure for the disk drive.

Magnetic disk drives are extensively used in computer systems.

Large magnetic disk drives have a driven air blower for circulating air across the disks and over the base plate. Examples of such drives are the IBM 3350 supplied by International Business Machines Corporation and STC 8350, supplied by Storage Technology Corporation. Another example is the ISS/UNIVAC 717 disk drive which has vented spacer rings with recirculating air ducted over the top of the spindle. The IBM 2314 disk drive also uses vented spacer rings.

Recently, smaller disk drives have been introduced. An example of such a disk drive is the IBM 3726 which is also known as the IBM System 32. Similar disk drives are made by many companies. These disk drives make use of very lightly loaded magnetic recording heads which are generally referred to as "Winchester" heads. In small magnetic disk drives of this type, there is no forced air circulation from a driven blower or the like. Some air flow is induced by the spinning action of the bottom of the lowermost disk in the pack and fins on the bottom of the hub. There is air flow beneath the bottom of the hub and across this lower surface. This air is channeled through a recirculating filter, under the base plate which serves as its heat exchanger, and back under the hub, completing the air path.

The cooling of prior art magnetic disk drives has not been completely satisfactory. The rotary assembly, including spindles, disks and spacer rings, are mounted on a precisely machined cast aluminum base plate, together with the magnetic recording head actuator assembly. As these machines warm up, a thermal gradient in the base plate is generated due to heat being extracted from the bottom side of the base plate. Magnetic recording head alignment changes due to base plate warpage as the base plate thermal gradient changes. For this reason, prior art machines require a warm-up period for the thermal gradients to stabilize and thus for the magnetic recording head alignment to stabilize before read/write functions can be exercised.

An object of this invention is to provide a machine with circulating air flowing over both the top and the bottom of the base plate to reduce thermal gradients in the base plate so that the disk drive is ready for operation as soon as it is started.

It is a further object of the present invention to provide a disk drive in which air is driven through a closed path in the drive by the rotating action of the magnetic disks which pump air through this closed path.

It is another object of the present invention to minimize thermal gradients in magnetic disks.

It is another object of the present invention to provide heat transfer from the head disk enclosure remote from the base plate.

It is another object of the present invention to provide increased air flow through the head disk assembly.

SUMMARY OF THE INVENTION

In accordance with the present invention, air is pumped by the magnetic disks through a closed air path extending over and under the base plate of a magnetic disk drive. The air is pumped through a heat exchanger and an air filter to maintain uniform temperature and cleanliness of the recirculating air. The air path extends to the inside of a hollow rotating hub which rotates the magnetic disks. Air vents in the hub are aligned with vented spacer rings for the magnetic disks. This provides an air path from the hollow center of the frame through the hub and across the disks where the pumping action of the rotating disks forces the air through the closed air path.

Further in accordance with the invention, air is driven through the ambient side of the heat exchanger to effect a heat transfer from the enclosure. In accordance with this invention, the ambient air is driven by a blower which is driven from the same motor which drives the hub, thereby obviating the need for an additional fan motor.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Referring to the Figures, the disk drive of this invention is mounted in a structural foam frame 11. This material provides good rigidity and protection for the disk drive. While many types of structural foam are suitable for use, the material LEXAN FL-900, provided by General Electric has been found particularly suitable.

A cover 12 cooperates with the frame 11 to provide an enclosure for the disk drive. Because of the insulating properties of the structural foam from which the frame is constructed, it is necessary to provide good heat transfer from the enclosure to the ambient air. In accordance with the present invention, a closed air path for circulating air is provided inside the enclosure. This air path extends through a heat exchanger 13 (FIG. 3) which is exposed to ambient air to provide the heat transfer capability. Before describing the unique closed air recirculating path of this invention, the components of the disk drive and the components defining the closed recirculating air path will be described.

Figure 1:
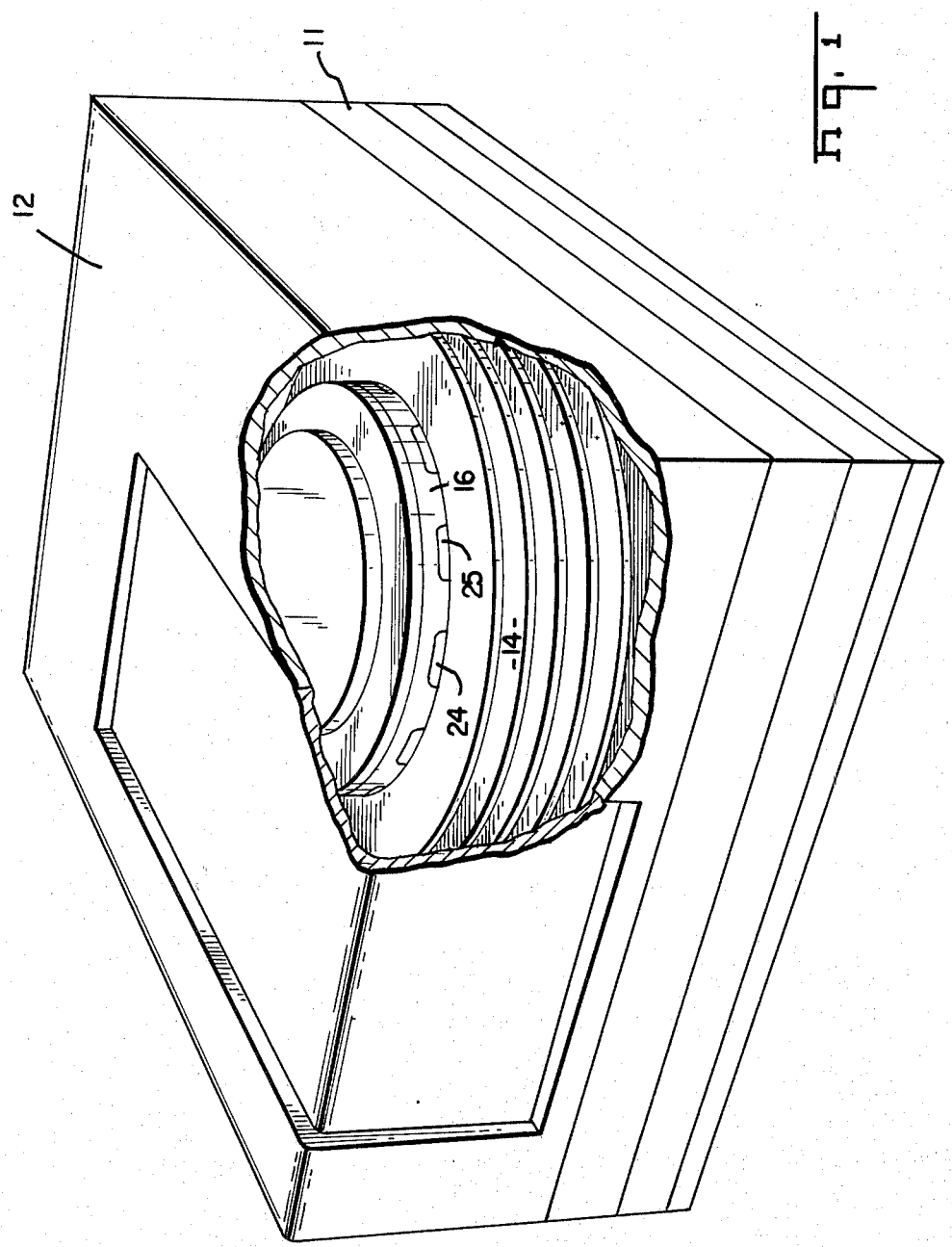
FIG. 1 shows the enclosure of the disk drive broken away to show the hub and disk assembly.

The disk drive of this invention includes magnetic disks 14 (FIGS. 1 and 2) and a magnetic recording head actuator 18 which carries magnetic recording head assemblies such as 19 into "READ/WRITE" position with the magnetic disks. In the example under consideration, these magnetic recording head assemblies are of the "Winchester" configuration.

Figure 3:
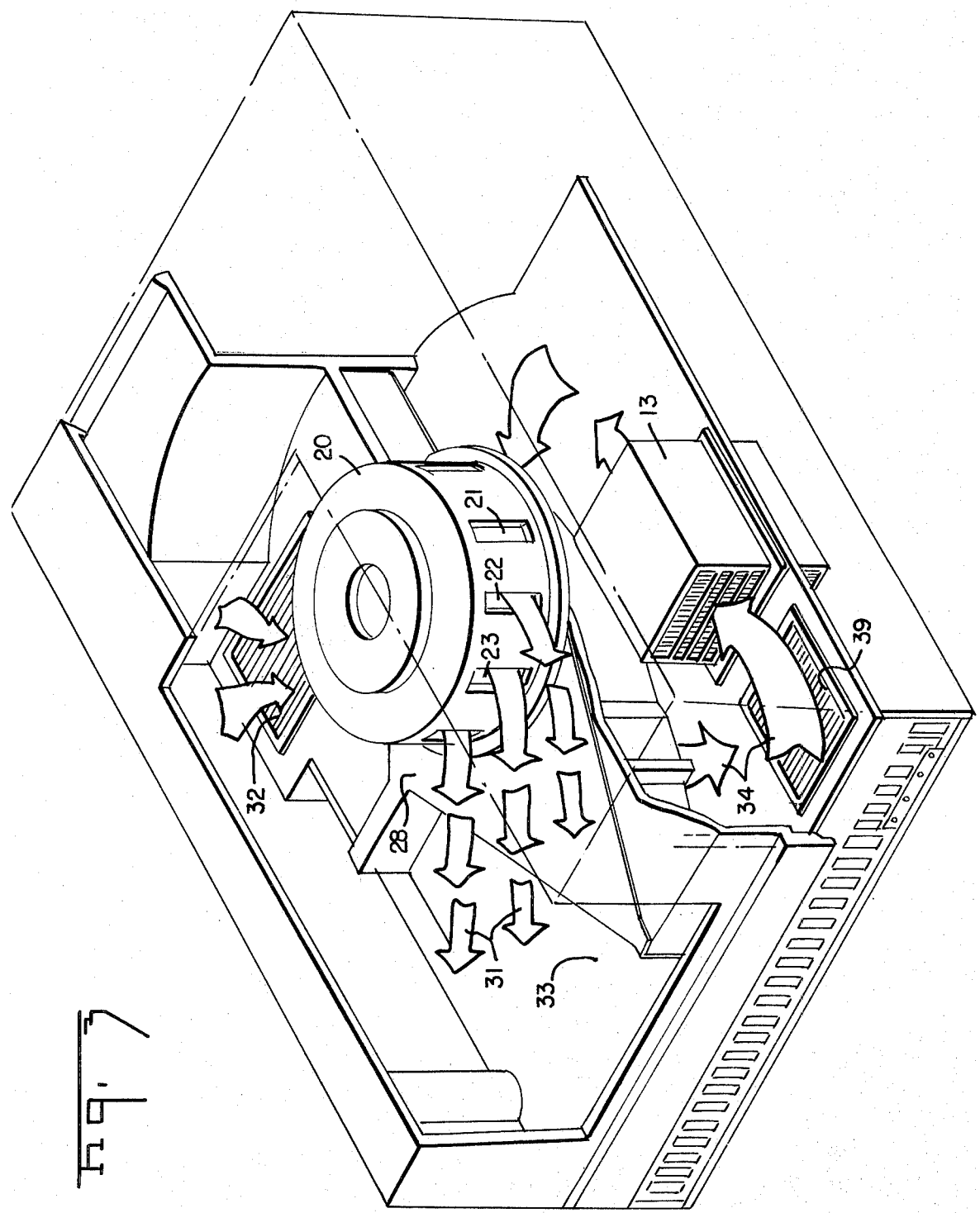
FIG. 3 is a perspective view showing the recirculating closed air path inside the enclosure.
Figures 6A, 6B:
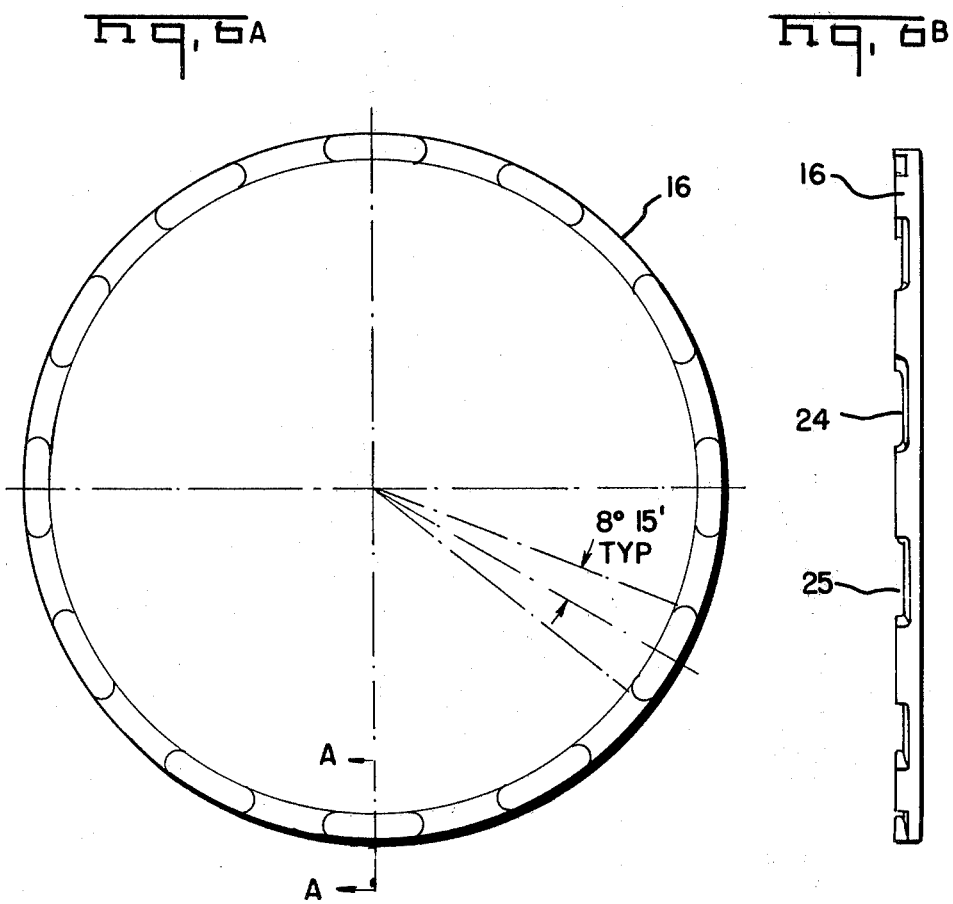
FIGS. 6A-6C show the spacer rings in the top, edge and section on the line A—A views respectively.
Figure 6C:
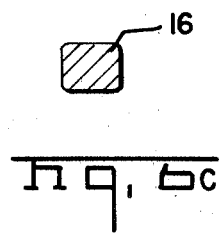

These magnetic disks are mounted on a hollow, rotating hub 20. As best shown in FIG. 3, the hollow hub 20 has air vents such as 21, 22 and 23. These vents line up with vents in the spacer rings such as 24 and 25. The spacer rings are used to mount the disks on the hub. The spacer rings with the vents therein are shown in more detail in FIGS. 6A-6C. These vented spacer rings have the added benefit of minimizing disk thermal gradients. This allows a greater data density on the disk surface. The hub 20 and shaft 26 are journaled in a spindle 27 in a conventional manner. The spindle 27 is mounted on a base plate 28. The base plate 28 is a rigid cast aluminum member which provides precise alignment between the actuator 18 for the head assemblies and the rotating hub 20. This alignment is critical to the operation of a magnetic disk drive.

In accordance with this invention, this alignment is maintained at all times, even on start-up, by minimizing the thermal gradient in the base plate, which minimizes base plate warpage. In order to do this, the path of recirculating cooling air passes above and below the base plate 28. The flow of air over and under the base plate 28 is depicted by the arrows in FIG. 2. The cover 12, frame 11, and rotating disk pack define a closed air path through which air recirculates over and under this base plate. This path will be described starting inside the hollow hub 20 in FIG. 2. As shown by the arrow 29 the air passes through the vents 21, 22, and 23 in the hub 20 and the vents 24 and 25 in the spacer rings to travel over both sides of 20 the rotating disks 14. The magnetic disks pump the air through the closed air path. Referring to FIG. 3, the air travels over the base plate 28 as indicated by the arrows 31. The air path extends to the rear of base plate 28 where there is a filter 32 which extends beneath the base plate. The recirculating air exits from the filter beneath the portion of the base plate 33. Filter 32 has a higher efficiency such as a 99.0% filter capability for 0.3μ diameter or larger particles. The standard air filter in disk drives is a 99.97% filter for 0.3μ diameter or larger particles. This increases the recirculating air flow through the head disk assembly without sacrificing cleanliness because the air is recirculating through the filter. Since this disk drive is assembled in a clean room, the only particles caught by the recirculating filter 32 are those generated within the head disk assembly.

The recirculating air exits from beneath the base plate as indicated by the arrow 34 and enters heat exchanger 13. The heat exchanger 13 is a parallel flow, air to air type with dip brazed aluminum fin construction. At the exit of the heat exchanger 13, a quadrant of hub 20 is exposed at the bottom thereof to the recirculating air path. Air enters the hollow hub as indicated by the arrow 35 in FIG. 2. This completes the recirculating air path.

Figure 2:
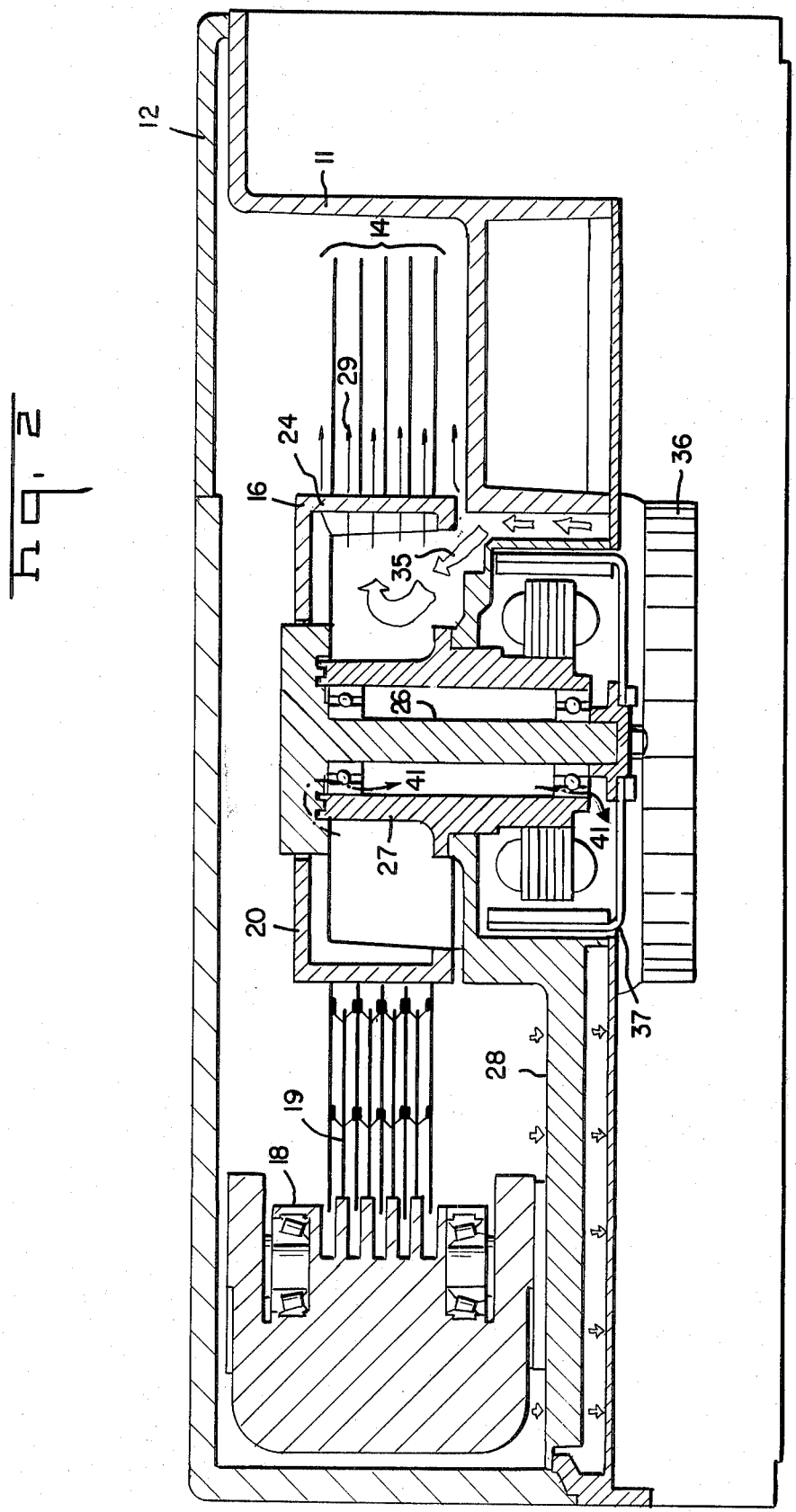
FIG. 2 is a cross-section through the hub, disks and head assembly.
Figure 4:
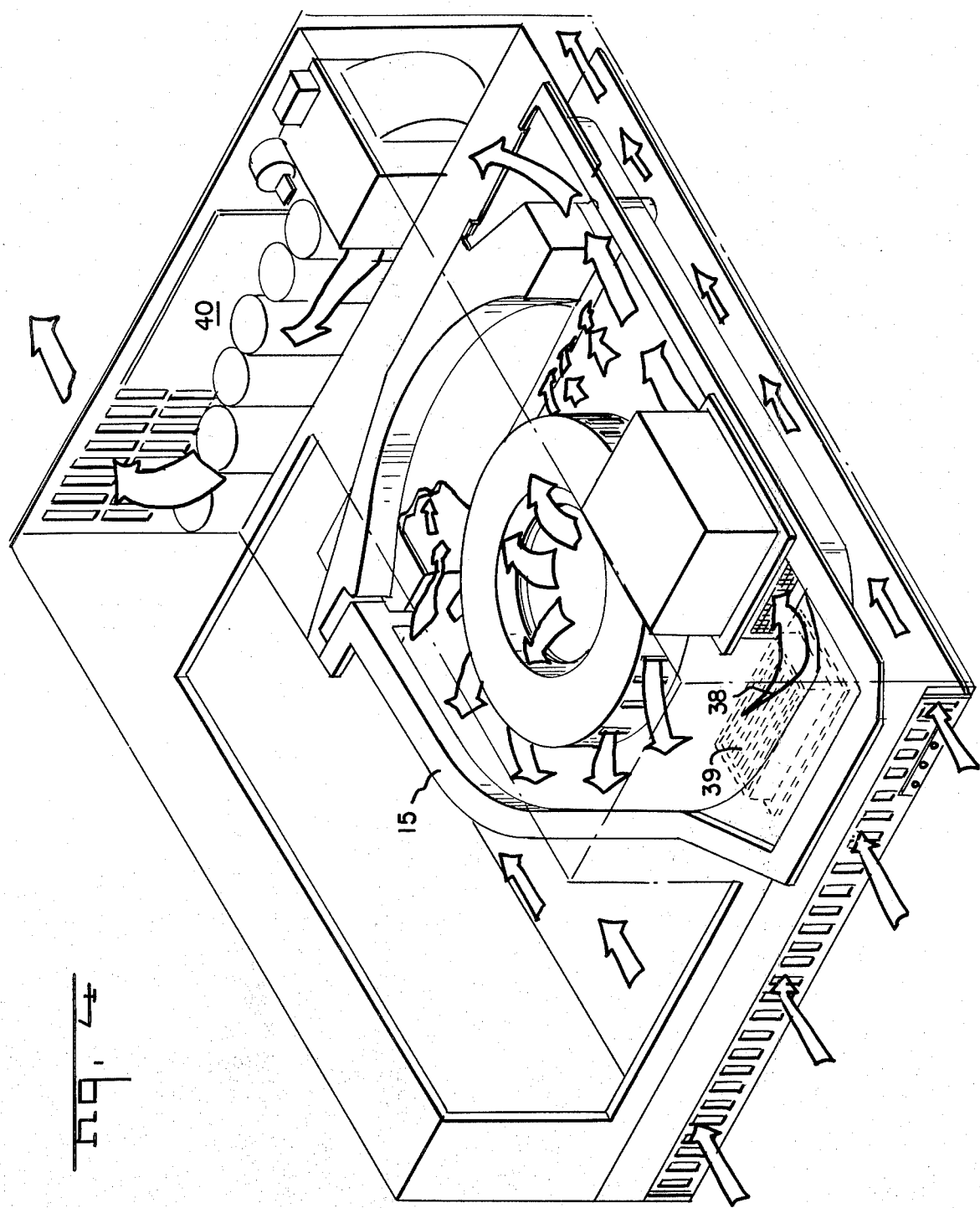
FIG. 4 is a perspective view of the disk drive with parts broken away to show the flow of ambient air through the heat exchanger and through the circuit boards at the rear of the drive.

The path of ambient cooling air for the magnetic disk drive is shown in FIG. 4. Ambient cooling air is driven by the centrifugal blower 36 (FIG. 2). Centrifugal blower 36 is driven by the same motor 37 which drives the rotating hub 20 for the magnetic disks. The centrifugal blower supplies the heat exchanger 13 with cooling air. The cooling air enters the lower portion of the heat exchanger as indicated by arrow 38 in FIG. 4. The centrifugal blower also supplies ambient cooling air to the uP circuit board which is on the bottom of the machine and to the power supply 40 in the rear of the enclosure. An ambient filter 39 is indicated by dashed lines for clarity in FIG. 4.

Leakage from the head disk enclosure is replaced by air which has passed through the ambient filter 39. The ambient filter is placed in a high pressure region within the confines of the fan pan 15 (FIG. 4). This air replaces leakage air which escapes from the enclosure. The enclosure is pressurized by ambient air which has passed through the ambient filter 39. All leakage paths from the enclosure provide an air flow away from the head disk assembly. Since this leakage is always replaced by air which has passed through the ambient filter, cleanliness in the head disk assembly is ensured. Since the head assembly is at the highest pressure point, all air flow is away from the head disk assembly. Only clean air enters the head disk assembly.

The arrows 41 in FIG. 2 denote a contamination air path through the spindle bearing. While it is impossible to completely obviate this contamination path, the present invention reverses it because higher pressure, clean air from the ambient filter pressurizes the head disk assembly.

Figure 5:
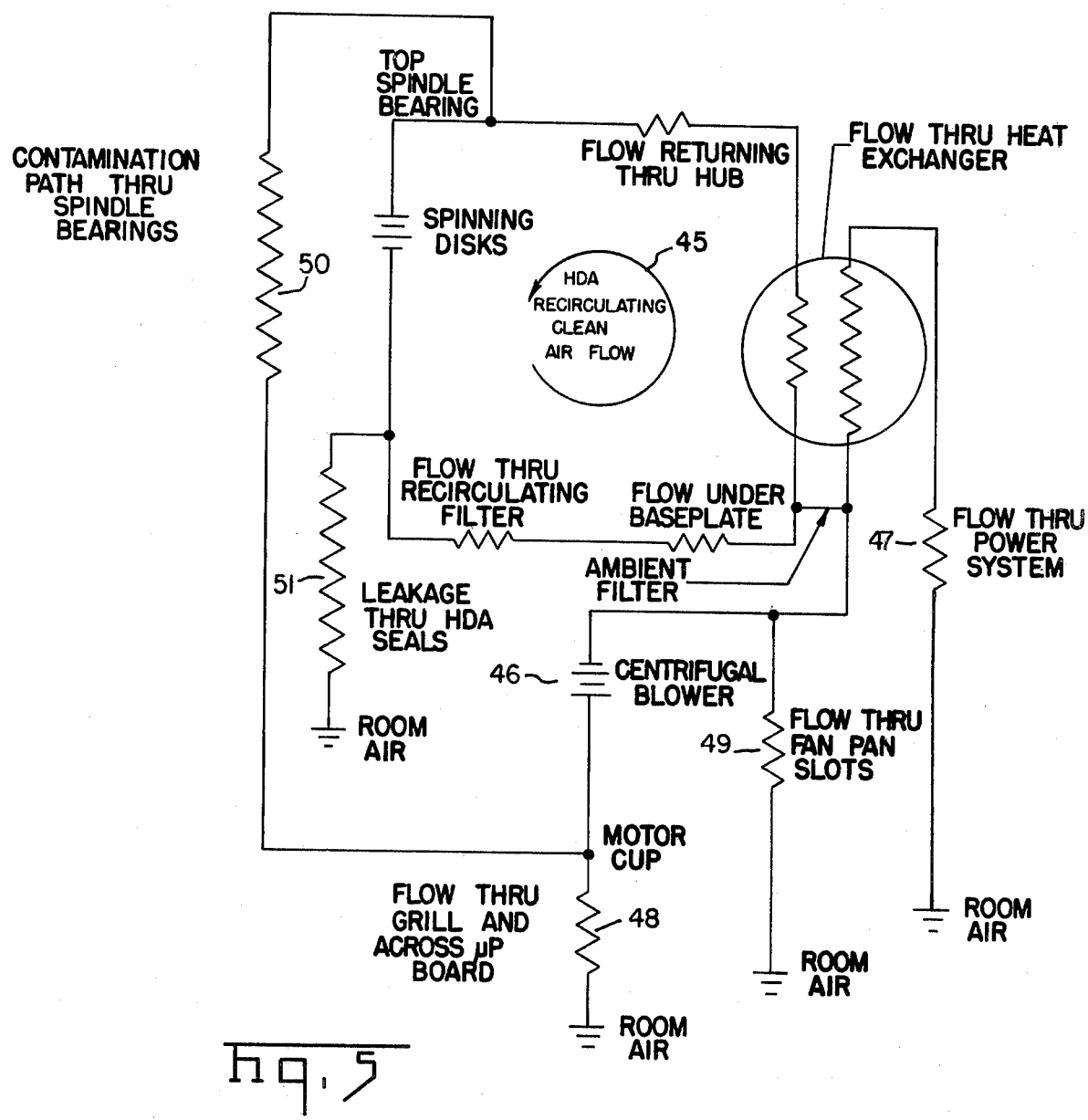
FIG. 5 is a schematic diagram depicting the air flows in the disk drive of the present invention.

FIG. 5 is a schematic diagram depicting the air flow. The arrow 45 depicts the recirculating air inside the enclosure. This recirculating air travels the path from the spinning disks over the base plate, through the recirculating filter, under the base plate, through the heat exchanger, and returns through the hub to the spinning disk. Heat is removed from this recirculating air by the heat exchanger. Ambient air is pumped through the other side of the heat exchanger by the centrifugal blower as depicted at 46 in FIG. 6. The ambient air traveling through the heat exchanger also flows through the power supply as indicated at 47. Ambient air also travels through the grill and across the uP circuit board, and through the fan pan slots, as indicated at 48 and 49. The contamination path of ambient air through the spindle bearings is indicated at 50 and the leakage of air through the head disk assembly seals is indicated at 51.

While a particular embodiment of the invention has been shown and described various other modifications are within the true spirit and scope of the invention. The appended claims are, therefore, intended to cover all such modifications.

What is claimed is:

1. A magnetic disk drive comprising:
   a hollow rotating hub having air vents;
   a base plate for mounting said hub for rotation thereon;
   a frame on which said base plate is mounted;
   an enclosure, said frame and enclosure defining a closed air path over and under said base plate, to the inside of said hub and through the vents therein;
   a heat exchanger in said air path;
   a centrifugal blower for circulating cooling air through said heat exchanger; and
   a drive motor for driving both said blower and said hub.

2. The magnetic disk drive recited in claim 1 further comprising:
   vented spacer rings for mounting said magnetic disks on said hub.

3. The magnetic disk drive recited in claim 1 wherein said frame is constructed of structural foam.

4. A magnetic disk drive comprising:
   a hollow rotating hub having air vents;

a base plate for mounting said hub for rotation thereon;

a frame on which said base plate is mounted;

an enclosure, said frame and enclosure defining a closed air path over and under said base plate, to the inside of said hub and through the vents therein;

a magnetic recording head assembly positioned in said closed air path;

a source of pressurized ambient air; and an ambient filter, said pressurized ambient air being connected to said closed air path through said ambient filter so that leakage from said closed air path is replaced by clean ambient air.

5. The disk drive recited in claim 4, further comprising:

a high efficiency air filter in said closed air path.

6. The disk drive recited in claim 4, further comprising:

a heat exchanger in said air path.

7. The magnetic disk drive recited in claim 6 further comprising:

means for circulating cooling air through said heat exchanger.

8. The magnetic disk drive recited in claim 7 wherein said means for circulating comprises:

a centrifugal blower; and a drive motor for driving both said blower and said hub.

* * * * *